Patented May 11, 1971

3,578,728
LIQUID UNSATURATED POLYESTERS AND POLYESTER URETHANES CONTAINING CROSS-LINKED PARTICLES OF THE SAME RESINS
Wendell A. Ehrhart, Hellam, and Clarence E. Rohrer, Lititz, Pa., assignors to Armstrong Cork Company, Lancaster, Pa.
No Drawing. Filed Nov. 18, 1968, Ser. No. 784,955
Int. Cl. C08g 41/04
U.S. Cl. 260—859
8 Claims

ABSTRACT OF THE DISCLOSURE

Blends of particles of cross-linked unsaturated polyester resins and fluid unsaturated polyester resins. The blends possess properties unique to unsaturated polyester resins in that they may be readily processed using a variety of techniques not commonly associated with unsaturated polyester resins and the blends are readily curable to form useful articles. The cross-linked particles used in forming the blends are conveniently produced by subjecting the unsaturated polyester resin to mastication during or after polymerization.

BACKGROUND OF THE INVENTION

Field of the invention

This invention relates to polyester compositions and more specifically to those polyester compositions prepared from unsaturated polyester resins. The compositions are capable of being processed by technique which heretofore have not been associated with unsaturated polyester resin compositions.

Description of the prior art

Liquid unsaturated polyester resins have conventionally been processed essentially only by laminating techniques and by variations of the casting technique, which basically entails pouring the liquid into a mold or into place in some assembly and converting it directly into a solid infusible article. The curing usually must be done quite slowly to avoid cracks due to rapid shrinkage. Techniques have been developed for partially curing (B-staging) some unsaturated polyester resins so that they might be supplied to molders in less tacky form. However such materials are not processable by such common techniques as extrusion or calendering operations and thus, the utility of unsaturated polyester resins has been severely restricted.

SUMMARY OF THE INVENTION

When unsaturated polyester resins are subjected to appropriate mastication, either during or after polymerization, the cross-linked resin particles thus formed may be blended with the same or different liquid unsaturated polyester resins to form pre-mixes possessing properties unique to the unsaturated polyester resin family.

DESCRIPTION OF THE PREFERRED EMBODIMENTS

This invention relates to polyester resin compositions possessing unique properties. The compositions comprise blends of particles of cross-linked polyester resins, which have been prepared by subjecting an unsaturated polyester resin to scission during or after polymerization, together with fluid unsaturated polyester resins.

Unsaturated polyester resins which are useful in the practice of the present invention are substantially soluble, fusible, polymeric condensation products which may be either linear or branched. They are formed by condensing about 50 mol percent of one or more dihydric alcohols with about 50 mol percent of one or more dicarboxylic acids or their anhydrides. At least one of the acids and/or anhydrides used in forming the condensation product must be alpha,beta ethylenically unsaturated. The alpha, beta ethylenically unsaturated acid and/or anhydride must be present to the extent of at least about two mol percent of the dicarboxylic acid or anhydride reactants. Generally the mol percent of unsaturated acid or anhydride necessary will depend on the molecular weight of the unsaturated polyester resin and the degree of crosslinking desired. Examples of such ethylenically unsaturated acids are maleic, fumaric and itaconic.

As is well known in the art, small amounts of monofunctional and/or polyfunctional acids and/or alcohols may also be used in forming the polyester resin and generally may be present to the extent of up to about 10 mol percent of the reactants although larger quantities may be utilized if the functionality of the acid and/or alcohol mixture is maintained substantially about two.

It is also possible to modify the unsaturated polyester resins to obtain materials of higher molecular weight. Thus the unsaturated polyester resins may be chain extended through reaction of the unsaturated polyester resin with diisocyanates such as toluene diisocyanate. The thus modified polyester resins have improved properties for some applications, and the chain extension might be utilized, for instance, to increase the hardness, the gel-content, and the tensile strength as well as lowering compression set.

In addition to the polyester resins above described, mixtures of these polyester resins and modified polyester resins with up to about 70% by weight, based on the weight of the polyester resin, of one or more copolymerizable vinyl monmoers are useful in the practice of this invention. Among the copolymerizable vinyl monomers adapted for forming copolymers with the unsaturated polyester resins are styrene, chlorostyrene, vinyl toluene, diallyl phthalate, methyl methacrylate, acrylonitrile and diacetone acrylamide. Such mixtures are also commonly referred to as unsaturated polyester resins.

Generally speaking the preparation, inhibition, and initiation of useful unsaturated polyester resins are well known, see for instance U.S. Pat. 3,079,368, and many of these polyesters being commercially available. Ehrhart and Rohrer, U.S. patent application Ser. No. 530,783, filed Mar. 1, 1966 discloses an improved method by which unsaturated polyester resins of high molecular weight may be prepared and the disclosure contained therein is incorporated herein by reference.

The term "unsaturated polyester resin," when used hereinafter in the body of the specification is intended to be generic to an unsaturated polyester resin, a chain-extended unsaturated polyester resin, mixtures of either the unsaturated polyester resin or the chain-extended unsaturated polyester resin with up to 70% by weight of a copolymerizable monomer, and mixtures of any of these.

Finely divided particles of the cross-linked unsaturated polyester resin may be formed by initially treating the unsaturated polyester resin so as to cause at least partial polymerization of the unsaturated moieties rendering a substantial portion of the original polyester resin insoluble in all non-reactive solvents. This cured or partially cured polyester resin is then subjected to mastication as, for example, by subjecting the cured or partially cured resin to intensive mechanical forces such as shear as may be obtained in the nip of a rubber mill with the rolls set very close together. Partially cured materials will generally undergo additional cure in this step. At this stage, at least 65 percent and preferably more than 80 percent of the weight of the cured resin particles should be in the form of an insoluble gel.

The resultant, small particles of cross-linked polyester resin thus prepared (the primary particles may be agglomerated into a coherent mass) are then mixed with a fluid uncured polyester resin, which may be the same or different from that used in preparing the particles, together with polymerization initiators, inhibitors, fillers, pigments, and/or other additives as desired, using a rubber mill or other intensive mixer to form a blend of particles of the cured cross-linked polyester resin with the fluid unsaturated polyester resin. This blend, which is basically a pre-mix, may then be calendered, extruded and/or molded into the desired shape an the uncured unsaturated polyester resin portion thereof cured or polymerized by any of a variety of suitable techniques to yield a fully cured three-dimensional article. Unusually rapid cure cycles are possible due to reduced shrinkage and exotherms.

The steps performed in forming the cross-linked resin particles and the blends or pre-mixes in accordance with this invention need not always be separate and discrete, but may be combined or partially combined. Thus, where it may be advantageous to carry out the original polymerization and scission simultaneously, the unsaturated polyester resin may be caused to polymerize in a Banbury mixer with the rotors turning. Mechanical forces are thus present both during the reaction and subsequent to completion of the reaction, these forces sometimes being adequate to cause the desired degree of scission of the polymerized product so that no further scission of the particles is required. In any event, where both the polymerization and mastication (or scission) are carried on simultaneously in a mixer such as a Banbury, the cured polyester resin is obtained as a crumb or powder which is easier to handle and more suitable for charging to any subsequent masticating (or grinding) apparatus than it would be if cured in a mold or in a continuous sheet form. In some cases, the cross-linked resin may undergo additional breakdown during the mixing of the pre-mix.

The polymerization of the unsaturated moieties of a polyester resin is known to represent a chain reaction which may be initiated by free radical species obtained by homolytic cleavage of chemical bonds. Some methods of producing such free radicals are irradiation of organic molecules by ultraviolet light or high energy atomic particles, thermally or chemically induced homolytic scission of certain specific organic molecules such as peroxides and/or azides, and homolytic scission of chemical bonds in macromolecules by mechanical shear. Any of these methods may be employed in forming the cross-linked particles from the unsaturated polyester resin.

When the cure is performed through the thermal decompostion of peroxides and/or azides, the polyester resin to be used is initially blended with, based on the weight of the polyester resin, from 0.05% to 5.0% by weight of the organic peroxide and/or azide and the mixture is heated to a temperature sufficient to cause the peroxide or azide to decompose with the formation of polymerization initiating free radicals. While this may be accomplished by simply placing the catalyzed polyester resin in a container and curing it in an oven; it is generally more convenient to heat it in an internal mixer, such as a Banbury, so that both the curing and at least partial mechanical breakdown of the unsaturated polyester resin are accomplished in a single step. If the final pre-mix is to be filled and/or pigmented, lubricated or plasticized, for instance, it is often advantageous to mix part or all of the desired fillers and/or other additives with the unsaturated polyester resin in this step. The unsaturated polyester resin is thus cured and masticated in the presence of the desired additives.

The cured, or partially cured resin which has been formed in a mixer such as the Banbury as above described, or which has been formed by oven curing the unsaturated polyester resin and at least partially breaking down the cured polyester resin by at least partial mastication (i.e., by the use of some sort of crushing, grinding, or dicing device), may be further subdivided by placing it in the nip of a rubber mill where the rolls are set so as to be touching or nearly touching one another, the slow roll of the mill preferably being heated. The material is fed between the rolls and generally starts banding. Material which falls off the rolls is returned to the mill at once, only a slight excess of the material being maintained in the nip. The mill is generally run until a smooth, dry sheet of agglomerated, cross-linked particles is formed, usually on the fast roll, which can be removed in a single piece. This ability of finely divided cured unsaturated polyester resins to "fuse" and flow on a mill is quite surprising and unexpected.

If a smooth well consolidated sheet is obtained, one can be reasonably certain that the cured resin will be useful in forming pre-mixes in accordance with this invention which may be readily handled on such equipment as calenders and extruders. Sometimes, depending on the unsaturated polyester resin being processed, it is possible to stop short of a well-consolidated smooth sheet and still have particles of polyester resin which make useful blends. With some polyester resins, for example, the mill grinding or shearing can be stopped when the cross-linked resin has the appearance of a fluffly powder; such powders, when blended with a fluid unsaturated polyester resin, forming processable pre-mixes.

It may not be possible to properly grind or masticate all cured unsaturated polyester resins by this method since the most highly cross-linked harder resins may put too much strain on the mill. This limit can be adjusted so that some of the harder polyester resins may be handled on the mills by increasing the roll temperatures, however, the temperature at which the polyester resin is being treated should not be allowed to get too high since the finely divided polyester resin may begin to smolder and char due to a reaction with oxygen in the air at these higher temperatures. Adjustments may also be made in the distance at which the rolls are set apart when dealing with certain of the more highly cross-linked harder polyester resins. Various types of grinding apparatus, such as ball mills, may be utilized in forming particles of the harder cross-linked polyester resins.

As indicated previously, when cross-linked unsaturated polyester resins are ground on rubber mill rolls, the small particles formed may coalesce or "fuse" together to form a sheet which would appear to be non-particular. This present a problem in the determination of primary particle size. Accordingly, the following method was developed which permits the estimation of primary particle size in at least most instances.

(1) A sample (0.5–2.0 grams) of ground, cured, unsaturated polyester resin or a pre-mix containing 0.5–2.0 grams of such resin is placed in a jar with 100 ml. chloroform and allowed to stand at room temperature overnight. Apparently the chloroform gets between the particles and weakens their attraction for one another. In some cases, the sample rapidly and completely disintegrates into primary particles, whereas in other cases, deagglomeration is incomplete in this step.

(2) The suspension is then poured into a quart size Waring Blendor, which is plugged into a rheostat. The Blendor is then operated at 35 volts for five minutes. During this time, the Blendor is stopped briefly two times and the jar shaken by hand to wash down the walls. This operation completes the deagglomeration.

(3) If the sample contains fillers, these can often be removed by centrifuging the suspension. The resin particles float on the chloroform whereas most fillers sink.

(4) The suspension from 2 or 3 above is then used to prepare a microscope slide as follows. A representative sample of the suspension is diluted with an equal volume of dimethylsulfoxide. A drop of the stirred, diluted suspension is placed on a microscope slide and covered with a cover glass. The slide is then examined under a calibrated microscope. Shortly after the particles stop moving (movement is due to chloroform evaporation), focus is made on a typical group of particles using a degree of magnification which will allow viewing of about 50-200 particles. The size of the average particle is estimated by measuring at least 50 particles at random, adding up the diameters and dividing by the number of particles measured. This may be done more conveniently by taking a photograph and making measurements from the photograph unless the contrast is insufficient to obtain a good picture.

In order to determine whether or not the above procedure would cause the breakdown of primary resin particles, numerous unsaturated polyester resins were cured in molds (no grinding) and samples were put through the above procedure.

Although some breakdown of large particles did occur, the average particle size obtained from such unground or unmasticated samples was always greater than about 100 microns (usually about 300 microns) whereas in every case when freshly masticated cured resins, suitable for the preparation of readily millable, calenderable, premixes were examined, the average particle size was found to be less than 15 microns and usually less than 10 microns.

It is recognized that the method described measures swollen resin particles and that in unusual cases, such particles could be two or three times their unswollen size. It is further recognized that the maximum useful average particle size of a particular resin for a particular application will be governed to a degree by the particle size distribution and particle geometry. In view of these and other considerations, it is possible that the maximum useful average particle size could be extended beyond 15 microns in specific cases.

It is believed that the function of the mastication or shearing process is to "grind" the three-dimensional cross-linked polyester resin to a primary particle size such that the three-dimensional particles begin to take on some of the properties of ordinary macromolecules, and sufficient surface contact is obtained, particularly under pressure in the mill nip, to cause the particles to coalesce or adhere to one another by utilizing secondary valence (Vander Waals) forces. These particles apparently are capable of flowing over and around one another under sufficient applied shear as evidenced by the ability of the cross-linked polyester resin to flow on the mill. Pre-mixes containing "poorly" masticated cured polyester resins; that is, particles having average diameters greater than about 15 microns, though they may have poor calendering and extruding characteristics, may still be useful in molding compositions which, upon molding, display reduced shrinkage and exotherms, thus permitting faster molding cycles than conventional polyester resin molding compounds.

Alternatively, the particles of cured unsaturated polyester resin may be formed by scission of the macromolecules directly from the unsaturated polyester resin by mechanical shear on a mill. The unsaturated polyester resin (additives are unnecessary and inhibitors undesirable) is placed on a rubber mill at a temperature slightly above the glass transition temperature of the polyester resin and maintained as cool as possible as long as the resin is in the rubbery state. The mill is run with the rolls preferably set close together until the resin is transformed from a viscous, tacky fluid through a dry lacy or powdery state to a reasonably smooth dry band on the mill. This method is applicable only to those polyester resins of relatively high viscosity and the time required for transformation varies with the particular polyester resin and with the milling conditions. With some of the more fluid polyester resins, inhibitors must be absent and it may be necessary to stop the mill occasionally to allow the frictional heat to dissipate. It is postulated that this method produces free radicals by the mechanical breaking of chemical bonds during the milling and these radicals are responsible for the formation of additional bonds since they initiate chain reaction polymerization of the unsaturated moieties. The cured (cross-linked) polyester resin obtained with this method of polymerization initiation is in a form which has already undergone at least partial if not complete mechanical breakdown.

When the cured polyester resins contain fillers such as limestone, it has been found that they are often easier to masticate properly. In fact, in some cases satisfactory masticated, cross-linked resin-filler mixtures are obtained direct from the Banbury mixer and the average particle size of some of these resins has been found to be less than about three microns. In other cases, the mix needs to be kept on a tight rubber mill for a shorter time than the same polyester resin which has been cured in the absence of filler.

Since it is the particle size of the cured polyester resin which is apparent determinative of the useful characteristics of blends or pre-mixes formed therewith, additional methods of carrying out the mechanical breakdown of the cured polyester resin to form particles of the desired size, could obviously be used. Generally speaking, particles having an average diameter of less than about 15 microns form blends with the fluid unsaturated polyester resins which have useful processing characteristics.

In order to form usable pre-mixes and/or blends of particles of cured polyester resins with fluid unsaturated polyester resins, the particles, which may be formed as above-described, and which may be either filled or unfilled, are blended with an appropriate amount of the fluid uncured, unsaturated polyester resin using a rubber mill or other intensive mixer. Where it is found desirable, the blend may be initially formed in a mixer such as a Banbury or Henschel and this step is generally followed by transferring the blend thus formed into a more intensive type mixer such as a rubber mill. When desired, other additives such as filler, pigment, lubricant, plasticizer, additional monomers, etc. may be added. Generally speaking, unless the uncured polyester resin already contains sufficient polymerization inhibitors, it is a good procedure and usually essential that inhibitors be introduced in this step in an amount sufficient to bring the total level of inhibitor to at least 0.01 and usually between 0.10 part by weight per hundred parts by weight of uncured polyester resin to 1 part by weight per hundred parts by weight resin. This prevents premature curing of the uncured portion of the resin blend which might otherwise occur due to the shear forces encountered in mixing as well as the addition of inhibitor increases the storage stability of the blends or pre-mixes thus formed. If the blends or pre-mixes are designed to be cured by the application of heat it is also necessary to incorporate 0.10 to 5.0 parts by weight per hundred parts by weight of uncured polyester resin, of an appropriate organic peroxide or azide catalyst during this mixing step. As an aid in processing, it is sometimes desirable to pre-dissolve or disperse any or all of the additives in the fluid unsaturated polyester resin prior to mixing or blending it with the particles of cured (cross-linked) polyester resin.

The amount of fluid unsaturated polyester resin to be added to the particles of cured unsaturated polyester resin will depend on many factors such as the nature of the individual polyester resins being blended, the degree of mastication of the cured polyester resin, filler type and level, the processing conditions anticipated and numerous other factors. The three predominant factors to be considered would appear, however, to be the chemical composition of the polyester resin particles, the filler type and the filler level. Thus unfilled blends which are based on lightly cross-linked, elastomeric, cured, masticated polyester resins may require as little as 5 to 20 parts by weight of uncured, fluid unsaturated polyester resin per one hundred parts by weight of cured particles. Rigid polyester resin particles may require 60 to 80 parts by weight of the fluid unsaturated polyester resin per one hundred parts by weight of the cured particles. The introduction of high levels, such as 50% to 55% by volume, of absorptive fillers such as wood flour, clay, and/or alpha-cellulose may increase the requirements for fluid unsaturated polyester resin to as much as 500 to 1,000 parts per one hundred parts by weight of cured, masticated polyester resin. The fluid unsaturated polyester resin apparently functions similar to a plasticizer in the blends in that it imparts greater plasticity and roll tack to the cured, masticated resin and improves its moldability.

To obtain an optimum balance of roll tack and plasticity for these blends, it has been found to be usually desirable to incorporate from 0 to 10 parts, and usually from 0.5 to 3.0 parts by weight, of a lubricant such as stearic acid per one hundred parts by weight of total polyester resin in the pre-mix.

The blends or pre-mixes may be formed and treated in a variety of ways to form useful fully-cured articles. By way of example, the premixes may be calendered into flat sheets and cured in an oven or cured by using a flat bed press where the sheet is formed and cured under heat and pressure. The pre-mixes of this invention are also capable of being calendered or extruded into flat sheets or rods which may then be ground or diced to give molding powders or moldable chips. These are then capable of being processed using conventional compression or injection molding equipment to form and cure the final article under heat. The chips and powders may also be mottled, positioned on a backing and then fed to a calender or flat bed press for consolidation and cure (i.e., by heat) to produce decorative surface coverings.

Pre-mixes which contain both high levels of cured polyester resin particles and high levels of filler cure to give highly useful composites indicating that both the fluid unsaturated polyester resin portion and the particles of cured polyester resin act as binder in the composites thus formed.

The following examples illustrate specific embodiments of the invention.

EXAMPLES 1–10

The unsaturated polyester resins comprising Examples 1–9 were prepared by a two-stage fusion cook using the following generalized procedure with any exceptions to the generalized procedure being noted in Table I.

The acid(s) and/or anhydride(s), glycol(s) and catalyst were charged to a 5-liter, 5-necked flask equipped with a heating mantle, stirrer, thermometer, gas inlet tube and a vacuum jacketed fractionating column (L.=48 cm., I.D.=1.5 cm.) filled with glass helices. A still head with thermometer and take-off condenser surmounted the fractionating column. Carbon dioxide was bubbled through the mixture at the rate indicated in Table I. The temperature was then raised (as rapidly as possible without driving the temperature of the distilling vapors (water) at the top of the column above about 115° C.) to that indicated in Table I. The flask was then insulated with asbestos cloth and the esterification alolwed to proceed under these conditions for the time indicated. This represented the time required to obtain an acid number of less than about 5. The gas inlet tube was then replaced by a hose adaptor to which was attached a McLeod gauge, and the column by a still head and short air condenser leading to a cooled receiver. The system was evacuated and the temperature adjusted to obtain those conditions indicated for the alcoholysis stage. These conditions were then held for the indicated time. During this stage, most of the molar excess of glycol was liberated by alcoholysis and distilled. This caused an increase in molecular weight of the resin. The resin was then cooled to about 150° C. prior to addition of inhibitor (if any) and exposure to the atmosphere. The unsaturated polyester resin of Example 10 was prepared in the same manner as the others except that the esterification was terminated when the acid number fell below 20 and no alcoholysis stage was employed. All the above resins were viscous tacky fluids at room temperature or slightly above.

TABLE I

| | Example | | | | |
|---|---|---|---|---|---|
| | 1 | 2 | 3 | [1]4 | 5 |
| Ingredients: | | | | | |
| Phthalic anhydride gram-moles | 11.88 | 12.74 | 12.25 | 13.0 | 13.0 |
| Maleic anhydride gram-moles | 2.52 | 2.86 | | 2.6 | 2.6 |
| Fumaric acid gram-moles | | | 2.75 | | |
| Ethylene glycol gram-moles | 9.84 | 10.01 | 9.6 | | |
| Triethylene glycol gram-moles | 7.56 | 8.71 | 7.4 | | |
| Trimethylolpropane gram-moles | | | 0.6 | | |
| Diethylene glycol gram-moles | | | | 17.94 | 18.7 |
| Zinc chloride grams | | | 8.0 | 3.6 | 3.6 |
| Stannous oxalate grams | 5.4 | 6.0 | | | |
| 4-t-butylcatechol [2] wt. percent | | | | 0.03 | 0.03 |
| Esterification Conditions: | | | | | |
| Hours | [3]2.75 | [4]4.2 | [4]4.5 | [4]9 | [3]6.0 |
| Liters of $CO_2$/min | 2.6 | 1.8 | 1.8 | 0.8 | 1.4 |
| Alcoholysis Conditions: | | | | | |
| Hours | [3]0.85 | [4]2.5 | [4]1.4 | [4]1.0 | [3]2.3 |
| Pressure (mm. Hg) | 0.6–2.0 | 0.5–5.0 | 0.9–1.2 | 2–6 | 2–4 |
| Analysis of Polyester: | | | | | |
| Acid number | 0.7 | 0.3 | 0.6 | 2.5 | 1.0 |
| Hydroxyl number | 22.0 | 22.7 | 28.0 | 41.4 | 20.2 |

[1] This reaction carried out in 22-liter flask. Multiply all amounts and rates by 4.5 to get actual amounts and rates used.
[2] Added upon cool down to 140–160° C.
[3] At 220° C.
[4] At 215° C.

TABLE II

| | Example | | | | |
|---|---|---|---|---|---|
| | 6 | 7 | 8 | 9 | 10 |
| Ingredients: | | | | | |
| Phthalic anhydride gram-moles | 13.0 | 11.5 | 11.0 | 10.0 | 7.15 |
| Maleic anhydride gram-moles | 2.6 | 2.3 | 1.0 | 2.0 | 8.45 |
| Ethylene glycol gram-moles | 10.27 | 5.18 | | | |
| Triethylene glycol gram-moles | 8.45 | | 10.0 | 12.5 | |
| Carbowax 400 [1] gram-moles | | | 5.0 | 2.5 | |
| Propylene glycol gram-moles | | | | | 18.2 |
| Dipropylene glycol gram-moles | | 11.4 | | | |
| Zinc chloride grams | 3.6 | | | | |
| Stannous octoate grams | | 8.0 | | | |
| Tetrabutyl-o-titanate grams | | | 9.0 | 6.9 | |
| Dibutyltin dilaurate grams | | | | | 7.0 |
| 4-t-butylcatechol [2] wt. percent | 0.03 | 0.03 | 0.03 | 0.03 | 0.10 |
| Toluene diisocyanate gram-moles | | | 0.36 | | |
| Esterification Conditions: | | | | | |
| Hours | [4]3.0 | [4]8.5 | [4]3.3 | [4]3.5 | [5]5.0 |
| Liters of $CO_2$/min | 1.4 | 2.2 | 2.2 | 2.2 | 1.8 |
| Alcoholysis Conditions: | | | | | |
| Hours | [4]1.3 | [5]2.1 | [4]1.8 | [4]2.0 | |
| Pressure (mm. Hg) | 2–3.5 | 0.7–2.0 | 0.5–1.0 | 0.7–1.5 | |
| Analysis of Polyester: | | | | | |
| Acid number | 1.3 | 0.6 | [6]<0.5 | 0.67 | 19.05 |
| Hydroxyl number | 25.5 | 28.9 | [6]10.2 | 19.1 | 15.0 |

[1] A polyoxyethylene glycol of $\overline{MW}_n$ of about 400 (Union Carbide Corp.).
[2] Added upon cool down to 140–160° C.
[3] Added to the resin at 150° during the cool down.
[4] At 220° C.
[5] At 215° C.
[6] Analysis subsequent to chain extension with 0.36 moles toluene diisocyanate. (Prior analysis; AN=0.5, HM=19.8.)

EXAMPLES 11-21

The unsaturated polyester resins of these examples were prepared by adding copolymerizable vinyl monomers and/or polymerization inhibitors to warm (90-150° C.) unsaturated polyester resins prepared in accordance with Examples 1-10 using suitable containers and stirring either mechanically or by hand until a homogenous solution was obtained. Polymerization initiators (if any) were then stirred in after cooling to room temperature. Table III below indicates the nature and relative proportions of the ingredients making up these resins.

TABLE III

| Ingredients, parts | Example | | | | | | | | | | |
|---|---|---|---|---|---|---|---|---|---|---|---|
|  | 11 | 12 | 13 | 14 | 15 | 16 | 17 | 18 | 19 | 20 | 21 |
| Resin of Example: | | | | | | | | | | | |
| 1 | 99.6 | | | | | | | | | | |
| 2 | | 99.6 | | | | | | | | | |
| 3 | | | 99.6 | | | | | | | | |
| 4 | | | | 85.0 | | | | | | | |
| 5 | | | | | 85.0 | | | | | | |
| 6 | | | | | | 85.0 | | | | | |
| 7 | | | | | | | 85.0 | | | | |
| 8 | | | | | | | | 99.7 | | | |
| 9 | | | | | | | | | 99.7 | | |
| 10 | | | | | | | | | | 80 | 70 |
| 4-t-butylcatechol | 0.4 | 0.4 | 0.4 | | | | | 0.3 | 0.3 | | |
| Styrene | | | | 15.0 | 15.0 | 15.0 | | | | 20 | 30 |
| Vinyltoluene | | | | | | | 15.0 | | | | |
| Benzoyl peroxide | | | | | | | | | | | 1.25 |

The following examples illustrate the preparation of cross-linked (polymerized) finely-divided unsaturated polyester resins using shear to simultaneously initiate the polymerization and to accomplish sub-division of the polymerized particles.

EXAMPLES 22-25

The ingredients listed below for each example were placed on a water-cooled 12" long, 6" diameter, two-roll rubber mill with the rolls set nearly touching one another. The mill was then run intermittently to avoid build up of excessive heat. After 3-8 minutes of this shearing (longest for Examples 22 and 25) the tacky fluids were transformed into tough dry bands (rough at first but quickly becoming smoother). Once this transformation began, the mill was allowed to run continuously until about three minutes after no further change could be detected. The cured masticated resins of Examples 22 and 25 were removed from the mill as fairly smooth, translucent, more or less rubbery sheets. When placed in chloroform, samples of these sheets swelled and broke up into smaller pieces. The cured, masticated resin-filler mixtures of Examples 23 and 24 were obtained in the form of large, dry, smooth, opaque flakes. Samples of these were found to disintegrate into small particles when immersed in chloroform. About 94 percent of the cured, masticated resin-filler mixture of Example 24 was insoluble in the chloroform (85 percent gel).

TABLE IV

| Ingredients (grams) | Example | | | |
|---|---|---|---|---|
|  | 22 | 23 | 24 | 25 |
| Resin of Example: | | | | |
| 1 | 200 | 150.0 | | |
| 2 | | | 190.5 | |
| 3 | | | | 240 |
| 50 mesh limestone | | 150.0 | 292.0 | |
| Stearic acid | | 0.85 | | |
| Styrene | | | | 4.5 |

The following examples (26 thru 34) illustrate the preparation of cross-linked (polymerized) finely divided unsaturated polyester resins using heat and a peroxide or azide to initiate the polymerization and, concurrently, shear to accomplish at least partial breakdown into small particles.

EXAMPLE 26

To a preheated (230° F.) Banbury mixer (capacity =1020 cm.$^3$) was charged 1158 grams of 50 mesh limestone, 758 grams of the resin prepared in accordance with Example 2 and 20.5 grams of styrene containing 0.5 gram of dissolved benzoyl peroxide. The mixer was run on fast speed. The temperature of the batch rose gradually to about 220° F. and then rapidly to a maximum of about 305° after which the temperature gradually fell to 240° F. where it appeared to be leveling off. The batch was discharged as a fine fluffy powder. About 92% of the batch was insoluble in chloroform (80 percent gel).

EXAMPLES 27 AND 28

The ingredients listed below were charged to a 1020 cm.$^3$ capacity Banbury mixer and heated (steam), with the mixer running, to 315° F. The rubbery crumbs (cured, partially broken down resins) obtained upon cooling to 200° F. and discharge were then further masticated in portions of about 250 grams on a water cooled 12" long, 6" diameter rubber mill, with rolls set nearly touching, until smooth rubbery bands were formed.

TABLE V

| Ingredients (grams) | Example | |
|---|---|---|
|  | 27 | 28 |
| Resin of Example: | | |
| 8 | 1,300 | |
| 9 | | 1,300 |
| t-Butylperoxy isopropyl carbonate | 5 | 5 |

EXAMPLES 29-32

The ingredients (except the 2nd portion of t-butylcatechol) shown below for each example were blended together in a beaker and charged to a 1020 cm.$^3$ capacity Banbury mixer. The mixer was then heated with 60 p.s.i. steam pressure and run on fast speed until 3 minutes after the temperature reached 280° F. Upon cooling to 265°, the 2nd portion of t-butylcatechol was added and mixed in. The powders obtained upon discharge (at 210° F.) were subjected in portions to additional shear (grinding action) on an 8" diameter rubber mill as follows. The slow roll was heated to 220° F. and the fast roll tap water cooled. The rolls were set touching one another and the mill was started. Powdered resin was added gradually to the mill until it was just full and then the mill was run for the indicated time period before doctoring the material off. These cured resins clung to the cold roll and gradually changed during the milling from coarse, losely compacted powders to fine, fluffy powders and eventually (except Example 29 which was removed from the mill after only 0.75 min.) to translucent reasonably strong smooth sheets. The milling times and approxiate average size of the primary particles making up these sheets are given below along with the formulations.

TABLE VI

| Ingredients (grams) | Example | | | |
|---|---|---|---|---|
| | 29 | 30 | 31 | 32 |
| Resin of Example: | | | | |
| 14 | 1,560.5 | 1,560.5 | | |
| 15 | | | 1,500.0 | |
| 16 | | | | 1,500.0 |
| 4-t-butylcatechol | 0.39 | 0.39 | 0.375 | 0.375 |
| Azobisisobutyronitrile | 7.02 | 7.02 | 6.75 | 6.75 |
| 4-t-butylcatechol [1] | 1.3 | 1.3 | 1.3 | 1.30 |
| Milling time (min.) | 0.75 | 5.0 | 5.0 | 5.0 |
| Approximate average particle size (in microns) | 8 | 4 | 9 | |

[1] Added to Banbury after polymerization completed to retard possible subsequent oxidation during the mill grinding.

EXAMPLE 33

The ingredients listed below (except the t-butylcatechol) were charged to a 1020 cm.$^3$ capacity Banbury mixer and heated (60 p.s.i. steam), with the mixer running on fast speed, to 340° F. Upon cooling to 265° F., inhibitor (t-butylcatechol) was added. The batch was discharged at 200° F. as a fluffy powder containing a few large chunks. This was further masticated or ground by passing it through a tight (rolls touching when mill empty) 6″ rubber mill (slow roll at 200° F., fast roll water cooled) four times, doctoring it off between passes. The material was obtained as large smooth light grey flakes.

EXAMPLE 33

Ingredients: Grams
- Resin of Example 17* — 560.0
- Benzoyl peroxide* — 8.04
- Vinyltoluene* — 73.2
- 325 mesh limestone — 738.0
- 50 mesh limestone — 738.0
- 4-t-butylcatechol — 0.63

*A solution of these ingredients was prepared prior to charging the Banbury.

EXAMPLE 34

The ingredients listed below (except the t-butylcatechol) were charged to a water cooled 1020 cm.$^3$ capacity Banbury mixer and the mixer run at fast speed. The fractional heat generated drove the batch temperature up fairly rapidly to about 275° F. at which point polymerization of the resin began and the temperature climbed very rapidly to 400° F. At this point, the mixer was stopped which also stopped the temperature rise. The batch was cooled to 265° and the t-butylcatechol was added. The batch was discharged at 210° F. as a finely divided white powder. The average size of the resin particles in this mixture was determined to be about 2 microns. The filler particles appeared to have undergone little breakdown.

EXAMPLE 34

Ingredients: Grams
- Solka Floc SW-40* — 577.5
- 325 mesh limestone — 577.5
- 4-t-butylcatechol — 0.345

*A purified wood cellulose (The Brown Company).

The remaining examples illustrate the preparation, sheeting, molding and final curing of pre-mixes from cured unsaturated polyester resin particles and uncured (fluid) unsaturated polyester resins.

EXAMPLES 35–38

The pre-mixes of this series were prepared by mixing the indicated fluid unsaturated polyester resin with the indicated finely divided cross-linked (polymerized) unsaturated polyester resin (or resin-filler mixture) along with the indicated monomers, fillers, initiators, etc. on a two-roll mill. The mixing was done with a water-cooled fast fast roll and a slow roll having a temperature of about 110° F. These pre-mixes, in general, had good roll tack and plasticity and were obtained from the mill as reasonably strong smooth flat sheets (very little shrinkage) of about 75 mills thickness. These sheets were dry to the touch at room temperature and showed no tendency to flow under their own weight.

TABLE VII

| Pre-mix ingredients (grams) | Example | | | |
|---|---|---|---|---|
| | 35 | 36 | 37 | 38 |
| Resin of Example: | | | | |
| 11 | 45.0 | 45.0 | 45.0 | |
| 13 | | | | 69.0 |
| Cured resin of Example 22 | 140.0 | 140.0 | | |
| Cured resin-filler of Example 23 [1] | | | 280.0 | |
| Cured resin of Example 25 | | | | 214.5 |
| Stearic acid | 0.80 | 0.80 | 0.80 | 1.5 |
| 4-t-butylcatechol | | | 0.18 | |
| Diallyl phthalate | 15.0 | 15.0 | 15.0 | 18.0 |
| BPIC [2] | 1.2 | 1.2 | 1.2 | 1.5 |
| 50 mesh limestone | | 200.0 | 60.0 | |
| Titanium dioxide (rutile) | | 21.0 | 21.0 | |
| Pre-mix characteristics: | | | | |
| Mixer | ([3]) | ([3]) | ([3]) | ([3]) |
| Wt. percent total filler and pigment | 0.0 | 52.4 | 52.4 | 0.0 |
| Strength of sheet | Good | Good | Good | Good |
| Cured pre-mix properties: | | | | |
| Hardness (Shore D) | 30 | 52 | 61 | |
| Tensile strength [4] | 1,273 | 823 | 1,150 | 1,583 |
| Ultimate elongation (percent) [4] | 232 | 73 | 75 | 179 |
| Percent gel | 86.3 | 88.8 | 88.8 | |
| G. CHCl$_3$/g. gel | 2.76 | 3.6 | 3.23 | |
| Tensile set (percent) [4] | 0.0 | 2.0 | 2.0 | 1.0 |
| Indentation [5] (mills) | 48 | 36 | 29 | |
| Residual indentation [6] | 0.0 | 3.0 | 3.0 | |
| Dimensional stability [7] | −.74 | −.39 | −.25 | |

[1] Contains 50 wt. percent 50 mesh limestone.
[2] t-Butylperoxy isopropyl carbonate.
[3] Mill.
[4] Tensile properties determined on Instron, ½ × 6″ samples, 1″ jaw distance, 6″ per minute machine speed.
[5] 200 lbs. on 0.178″ diameter tip for 10 minutes.
[6] 8 ounces on 0.047″ diameter tip after 24 hours.
[7] Percent change after 24 hours at 250° F.

Sections of these sheets were placed in a 40 to 50 mill, 9″ by 9″ frame and molded and cured in a flat bed press at 330° F. for 7 minutes. The fully-cured samples obtained were 50–70 mills thick, were flexible and leather-like in feel. Their excellent dimensional stability and residual indentation characteristics suggests their utility in the manufacture of resilient flooring, desk and counter-top coverings, artificial leather goods and the like. The unfilled cured samples were clear but had a yellow-brown tint.

EXAMPLES 39–41

The pre-mixes of this series are identical in formulation. They differ only in the equipment used in their mixing (and thus in batch size) and more importantly in the method used in the preparation of the finely divided polymerized resin-filler blend (and thus in the degree of subdivision of the cured resin). Examples 40 and 41 utilize a polymerized resin-filler blend (from Example 26) obtained directly from a Banbury mixer. The poor strength of these pre-mix sheets reflect the relatively lesser degree of subdivision of the polymerized resin obtained in the Banbury as opposed to that obtained on a rubber mill (resin-filler blend from Example 24 and used in Example 39 was polymerized and masticated in a rubber mill). The physical properties of the fully-cured pre-mixes also appear to be affected by the degree of subdivision of the polymerized resin. The mixing, sheeting, molding and curing of Examples 39 and 41 was carried out in the same manner as described for Examples 35 through 38. Example 40, was mixed in a 1020 cm.$^3$ capacity Banbury mixer (keeping the temperature below 150° F.) then sheeted on a mill, molded and cured in the same manner as the others.

TABLE VIII

| | Example | | |
|---|---|---|---|
| | 39 | 40 | 41 |
| Pre-mix ingredients (grams): | | | |
| Resin of Example 12 | 49.5 | 214.4 | 49.5 |
| Cured resin-filler of Ex. 24 [1] | 292.0 | | |
| Cured resin-filler of Ex. 26 [1] | | 1,268.0 | 292.0 |
| Stearic acid | 0.9 | 3.9 | 0.9 |
| Styrene | 11.25 | 48.7 | 11.25 |
| Benzoyl peroxide [2] | 1.35 | 5.9 | 1.35 |

TABLE VIII—Continued

|  | Example | | |
|---|---|---|---|
|  | 39 | 40 | 41 |
| 50 mesh limestone | 94.5 | 410.0 | 94.5 |
| Titanium dioxide (rutile) | 22.5 | 97.5 | 22.5 |
| Pre-mix mixer | Mill | Banbury | Mill |
| Method of grinding cured resin | Mill | Banbury | (³) |
| Pre-mix characteristics: |  |  |  |
| Wt. percent total filler and pigment | 62 | 62 | 62 |
| Strength of sheet | (⁴) | (⁵) | (⁵) |
| Cured pre-mix characteristics ⁶: |  |  |  |
| Percent gel | 88.2 | 85.7 | 85.6 |
| Swelling (g. CHCl₃/g. gel) | 3.86 | 5.55 | 5.50 |
| Hardness (Shore D) | 56 |  | 45 |
| Tensile strength (p.s.i.) | 977 | 433 | 457 |
| Ultimate elongation (percent) | 49 | 87 | 111 |
| Tensile set (percent) | 1 | 2 | 4 |
| Indentation (mills) | 35 |  | 45 |
| Residual indentation (mills) | 3 |  | 3 |

¹ Contains 60 wt. percent 50 mesh limestone.
² Predissolved in the styrene.
³ Banbury.
⁴ Very good.
⁵ Very poor.
⁶ Same test conditions as in Examples 35–38.

The fully-cured sheets were flexible and leather-like and have properties suggesting their utility in the manufacture of resilient tile or sheet flooring, countertop surfacing and the like.

EXAMPLES 42–47

The pre-mixes of this series were prepared by mixing the indicated ingredients on a 12" by 6" diameter rubber mill (slow roll at about 110° F., fast roll tap water cooled). Once the mixtures became homogenous they adhered to the fast roll and could be readily removed from the mill in the form of smooth, flat, reasonably dry sheets¹ which did not undergo cold flow under their own weight. These sheets were molded and cured in the same manner as were those of Examples 35 through 41, to give 50–70 mill thick, 9" by 9" tile. The fully cured tile all had a leather-like feel. Such compositions have properties suggesting their utility in the manufacture of resilient flooring, countertop surfacing and artificial leather goods.

¹ The unfilled pre-mixes (Examples 44 and 46) were a little more soft and wet than optimum indicating that the ratio of fluid resin/cured resin was a little higher than optimum.

TABLE IX

|  | Example | | | | | |
|---|---|---|---|---|---|---|
|  | 42 | 43 | 44 | 45 | 46 | 47 |
| Pre-mix ingredients (grams): |  |  |  |  |  |  |
| Fluid resin of Ex.: |  |  |  |  |  |  |
| 14 | 61.6 | 61.6 |  |  |  |  |
| 15 |  |  | 90.4 | 61.6 |  |  |
| 16 |  |  |  |  | 92.4 | 61.6 |
| Cured resin of Ex.: |  |  |  |  |  |  |
| 29 | 136.0 |  |  |  |  |  |
| 30 |  | 136.0 |  |  |  |  |
| 31 |  |  | 206.0 | 136.0 |  |  |
| 32 |  |  |  |  | 204.0 | 136.0 |
| 4-t-butylcatechol | 0.10 | 0.10 | 0.15 | 0.10 | 0.15 | 0.10 |
| t-Butyl perbenzoate | 1.20 | 1.20 | 1.80 | 1.20 | 1.80 | 1.20 |
| Stearic acid | 1.10 | 1.10 | 1.65 | 1.10 | 1.65 | 1.10 |
| 50 mesh limestone | 284.0 | 284.0 |  | 284.0 |  | 284.0 |
| Rutile TiO₂ | 16.0 | 16.0 |  | 16.0 |  | 16.0 |
| Total filler and pigment (weight percent) | 60.0 | 60.0 | 0.0 | 60.0 | 0.0 | 60.0 |
| Cured pre-mix properties¹: |  |  |  |  |  |  |
| Tensile strength (p.s.i.) | 567 | 447 | 1,370 | 610 | 1,363 | 620 |
| Ultimate elongation (percent) | 32 | 44 | 178 | 74 | 180 | 61 |
| Tensile set (percent) | 2 | 3 | 1 | 4 | 0 | 4 |

¹ Test conditions same as for Examples 35–38.

EXAMPLE 48

A pre-mix was prepared from the indicated ingredients by first pre-blending them in a Henshel mixer (the dry ingredients were blended first followed by addition of the liquid ingredients which had been first blended together in a beaker by hand stirring). The temperature of the batch was kept below 150° F. during this process and the batch was cooled to room temperature with Dry Ice prior to discharge. The resulting powder was then further mixed for 1.5 minutes on a 12" by 6" diameter rubber mill with cooling water in both rolls. The homogeneous pre-mix, which formed a band on the fast roll, was obtained from the mill as a flat, smooth, reasonably dry white sheet. A sample was molded and cured in the same manner as were those of Examples 35 through 47, producing a 60 mill thick, 9" by 9" fully-cured opaque, white tile. This tile had a leather-like feel, had good resistance to cigarette burns and other properties indicatting its utility in the manufacture of resilient flooring, counter and desk surfacing materials.

EXAMPLE 48

Pre-mix ingredients:
| | |
|---|---|
| Fluid Resin of Ex. 17 (grams) | 84.63 |
| Vinyltoluene | 11.3 |
| Cured resin-filler of Ex. 33 (grams) | 624.1 |
| 4-t-butylcatechol | 0.07 |
| t-Butylperbenzoate (grams) | 1.7 |
| Stearic acid | 2.3 |
| Rutile TiO₂ | 20.02 |
| Total filler and p.i.g. (wt. percent) | 61.2 |

Cured Pre-mix properties:*
| | |
|---|---|
| Tensile Strength (p.s.i.) | 673 |
| Ult. elong. (percent) | 30 |
| Tensile set (percent) | 2 |

*Test conditions same as for Examples 35–38.

EXAMPLE 49 AND 50

The pre-mixes of these examples were prepared by mixing the indicated ingredients on a 12" by 6" diameter rubber mill (tap water cooled rolls) and then sheeting the mixture on the same mill. The smooth, flat sheets (approximately 70 mills thick) thus obtained were cut, placed in molds, molded and cured in a flat bed press for 15 minutes at 315° F. The resulting fully-cured 6" by 6" by 0.06" samples were of an elastomeric nature. They possessed good ozone and heat aging resistance and had outstanding resistance to oils. These materials are useful in the manufacture of gaskets, printing rolls and other rubber goods.

TABLE X

|  | Example | |
|---|---|---|
|  | 49 | 50 |
| Pre-mix ingredients (grams): |  |  |
| Fluid resin of Ex.: |  |  |
| 18 | 70.0 |  |
| 19 |  | 70.0 |
| Cured resin of Ex.: |  |  |
| 27 | 130.0 |  |
| 28 |  | 130.0 |
| HAF carbon black | 60.0 | 60.0 |
| Dicumyl peroxide (40%) | 7.5 | 7.5 |
| Properties of cured pre-mixes: |  |  |
| Hardness (Shore A) | 51 | 60 |
| Modulus at 50% elongation (p.s.i.) | 139 | 199 |
| Tensile strength (p.s.i.) | 1,138 | 914 |
| Ultimate elongation (percent) | 230 | 170 |
| Percent volume change, 70 hrs. 212° F.: |  |  |
| ASTM No. 1 oil | −3.36 |  |
| ASTM No. 3 oil | 0.00 |  |

EXAMPLE 51

A pre-mix prepared by pre-blending the indicated ingredients in a Hobart (paddle type) mixer. This pre-blend was then transferred to a water-cooled rubber mill where it was mixed more thoroughly. It banded on the fast roll and was obtained from the mill as a smooth, flat, dry, white sheet of reasonable strength. This sheet was then diced and run through an Alpine Grinder to obtain a granular "molding powder." This was compression molded (20 sec. at 340° F./500 p.s.i.) into hard, rigid, 28 mm. white thermoset closures (bottle caps). These caps had an average dynamic torque strength [2] of 33.5 inch lbs. When placed on bottles by hand using 18 inch lbs. torque and stored at 115° F./100% relative humidity for two weeks, they required an average of 4 inch lb. torque for removal. They were also found to be resistant to most solvents.

EXAMPLE 51

Pre-mix ingredients:
| | |
|---|---:|
| Fluid resin of Ex. 20 (grams) | 124.0 |
| Divinylbenzene (55%)* (grams) | 13.0 |
| Cured resin-filler of Ex. 34 (grams) | 261.0 |
| 4-t-butylperbenzoate (grams) | 2.0 |
| Zinc stearate (grams) | 2.0 |
| Rutile TiO$_2$ (grams) | 12.0 |
| Wt. percent Filter in pre-mix (—) | 50.0 |

*Dow Chemical Company.

EXAMPLE 52

A well-stirred suspension of 16.4 grams of benzoyl peroxide and 1300 grams of a commercial polyester resin [3] was charged to a Banbury mixer. The mixer was run on fast speed and heated with 60 p.s.i. of steam. When the batch temperature reached 330° F. the rotors were stopped. Upon cooling, 0.65 gram of t-butylcatechol was added at 250° F. and the batch was discharged at 200° F. as a white powder. A portion of this powder was placed in a ball mill and the mill rolled for five days. At the end of this time, the powder was separated into five fractions by screening (hand shaking used). The average particle size of each fraction was then estimated by the technique described previously. The results listed below indicate that the screening was not very effective, however, this did afford a series of cured resins of gradually decreasing particle size.

| Fraction No. (screen) | Particle size range, microns | Approx. average size, microns |
|---|---|---|
| 1 (on an 80 mesh) | 1–420 | 18 |
| 2 (on a 100 mesh) | 1–200 | 14 |
| 3 (on a 140 mesh) | 1–110 | 12 |
| 4 (on a 200 mesh) | 1–85 | 10 |
| 5 (through a 200 mesh) | 1–80 | 8 |

Five pre-mixes were prepared by mixing 25 grams of each of the above fractions with 14.52 grams of the liquid unsaturated polyester resin (Polylite 8039), 0.255 gram of t-butylperbenzoate and 0.255 gram of stearic acid on a 4″ by 2″ diameter rubber mill. In all cases, part of the liquid resin was withheld until the initial pre-mix was mixed and then the remainder of liquid resin was added gradually. The pre-mix from Fraction 1 was extremely weak throughout this procedure and became wet and sticky by the time all the liquid resin had been added. It was removed from the rolls as a sticky glob. The pre-mixes from the remaining fractions of cured resin became progressively stronger and drier as the particle size became smaller till finally the pre-mix from Fraction 5 could be obtained readily from the rolls as a smooth, strong reasonably dry, unbroken sheet. This sheet was molded and cured in a 3″ by 3″ by 0.065″ mold at 340° F./200 p.s.i. for five minutes to give a hard, rigid, translucent plastic.

---

[2] Inch lbs. of torque required to break cap when screwed into a bottle at the rate required to cap 366 bottles per minute.
[3] Polyite 8039, Reichold Chemicals, Inc. This resin contains styrene and is described as a rigid resin of good hot strength and chemical resistance.

We claim:
1. A polyester resin blend comprising in relative proportions:
   (1) 100 parts by weight of finely divided particles having an average diameter of less than 15 microns of a cross-linked member selected from the group consisting of (a) an unsaturated polyester resin and, based on the weight of said unsaturated polyester resin, from 0 to 70 percent by weight of a copolymerizable monomer; (b) a hydroxy-terminated chain-extended unsaturated polyester resin prepared from a hydroxy-terminated unsaturated polyester resin and a diisocyanate and, based on the weight of said unsaturated polyester resin, from 0 to 70 percent by weight of a copolymerizable vinyl monomer; and (c) mixtures thereof, and
   (2) 5 to 1,000 parts by weight of a fluid member selected from the group consisting of (a), (b) and (c)
      said unsaturated polyester resin comprising the condensation product of, in relative proportions,
         1 mol of a member selected from the group consisting of a dihydric alcohol and mixtures thereof, with
         0.7 to 1.3 mol of a member selected from the group consisting of a dicarboxylic acid, an anhydride of a dicarboxylic acid, and mixtures thereof, at least two mol percent of said member being alpha, beta ethylenically unsaturated.

2. The polyester resin blend as defined in claim 1 wherein (1) and (2) are the same.

3. The polyester resin blend as defined in claim 1 wherein (1) and (2) are different.

4. A method of forming a polyester resin blend which comprises
   (1) polymerizing a member selected from the group consisting of (a) an unsaturated polyester resin and, based on the weight of said unsaturated polyester resin, from 0 to 70 parts by weight of a copolymerizable vinyl monomer; (b) a hydroxy-terminated chain-extended unsaturated polyester resin prepared from a hydroxy-terminated unsaturated polyester resin and a diisocyanate and, based on the weight of said unsaturated polyester resin, from 0 to 70 parts by weight of a copolymerizable vinyl monomer; and (c) mixtures thereof,
   (2) subjecting said polymerized member to mastication to form finely divided cross-linked particles having an average diameter of less than about 15 microns, and
   (3) blending said particles with, based on 100 parts by weight of said particles, from 5 to 1,000 parts by weight of a fluid member selected from the group consisting of (a), (b) and (c),
      said unsaturated polyester resin comprising the condensation product of, in relative proportions,
         1 mol of a member selected from the group consisting of a dihydric alcohol and mixtures thereof, with
         0.7 to 1.3 mol of a member selected from the group consisting of a dicarboxylic acid, an anhydride of a dicarboxylic acid, and mixtures thereof, at least two mol percent of said member being alpha, beta1 ethylenically unsaturated.

5. A method of forming a polyester resin blend as defined in claim 6 wherein at least a portion of the polymerization step (1) is carried out simultaneously with at least a portion of mastication step (2).

6. An article of manufacture formed of the cured composition of claim 1.

7. An article of manufacture formed of the cured composition of claim 4.

8. An article of manufacture formed of the cured composition of claim 5.

(References on following page)

References Cited

UNITED STATES PATENTS

| | | | |
|---|---|---|---|
| 2,856,378 | 10/1958 | Lundberg | 260—861 |
| 2,880,192 | 5/1959 | Coffey | 260—860 |
| 2,888,432 | 5/1959 | Fauser | 260—858 |
| 3,012,987 | 12/1961 | Ansul | 260—858 |
| 3,214,491 | 10/1965 | Stanton | 260—861 |
| 3,222,421 | 12/1965 | Lundberg | 260—861 |
| 3,271,352 | 9/1966 | Weinberg | 260—858 |
| 3,284,539 | 11/1966 | McElroy | 260—858 |
| 3,448,172 | 6/1969 | Damusis | 260—859 |
| 3,462,514 | 8/1969 | Kurkowski | 260—861 |
| 3,509,232 | 4/1970 | Schollenberger | 260—858 |
| 3,345,434 | 10/1967 | Griffith | 260—901 |

PAUL LIEBERMAN, Primary Examiner

U.S. Cl. X.R.

260—13, 16, 18, 22, 40, 75, 77.5, 858, 861

UNITED STATES PATENT OFFICE
CERTIFICATE OF CORRECTION

Patent No. 3,578,728　　　　　　　　　Dated　May 11, 1971

Inventor(s)　Wendell A. Ehrhart and Clarence E. Rohrer

It is certified that error appears in the above-identified patent and that said Letters Patent are hereby corrected as shown below:

Column 2, line 39, "monmoers" should be --monomers--. Column 3, line 23, "an" should be --and--; line 63, "postion" should be --position--. Column 4, line 59, "present" should be --presents--; lines 73, 74 and 75, "Blendor" should be --Blender--. Column 6, line 29, "apparent" should be --apparently--.

Column 7, line 72, "alolwed" should be --allowed--. Column 8, Table II, at the fourth ingredient, following the word "gram", should be a hyphen "-"; at the last ingredient, following the word "diisocyanate", should be a --3 prime-- which refers to the footnote. Column 9, Table III, in the Resin of Example column, between "4" and "6", insert --5--. Column 10, line 70, "losely" should be --loosely--; line 74, "proxiate" should be --proximate--.

Column 11, line 44, "fractional" should be --frictional--; Example 34, line 56, as the first ingredient, insert --Resin of Example 21........344.6 Grams--; line 73, delete the word "fast" first occurrence. Column 12, line 33, "to" should be --or--; line 57, "masticated in" should be --masticated on--. Column 14, line 14, "indicatting" should be --indicating--.

In the Claims, Claim 4, last line, "betal" should be --beta--; Claim 5, line 2, "claim 6" should be --claim 4--; Claim 7, line 2, "claim 4" should be --claim 2--; Claim 8, line 2, "claim 5" should be --claim 3--.

Signed and sealed this 2nd day of November 1971.

(SEAL)
Attest:

EDWARD M. FLETCHER, JR.　　　ROBERT GOTTSCHALK
Attesting Officer　　　　　　　Acting Commissioner of Patents